US010052711B2

(12) United States Patent
Sakamoto et al.

(10) Patent No.: US 10,052,711 B2
(45) Date of Patent: Aug. 21, 2018

(54) MEMBER JOINING STRUCTURE

(71) Applicant: Fuji Jukogyo Kabushiki Kaisha, Tokyo (JP)

(72) Inventors: Noboru Sakamoto, Tokyo (JP); Keiji Nakamura, Tokyo (JP); Kensuke Sakai, Tokyo (JP); Akiko Inami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 189 days.

(21) Appl. No.: 14/641,161

(22) Filed: Mar. 6, 2015

(65) Prior Publication Data

US 2015/0273620 A1 Oct. 1, 2015

(30) Foreign Application Priority Data

Mar. 28, 2014 (JP) ................. 2014-068387

(51) Int. Cl.
  *B23K 11/20* (2006.01)
  *B23K 103/20* (2006.01)
  *F16B 5/08* (2006.01)

(52) U.S. Cl.
  CPC .......... *B23K 11/20* (2013.01); *B23K 2203/20* (2013.01); *F16B 5/08* (2013.01); *Y10T 403/35* (2015.01)

(58) Field of Classification Search
  CPC ............. Y10T 403/471; Y10T 403/472; Y10T 403/477–403/479; Y10T 403/60;
(Continued)

(56) References Cited

U.S. PATENT DOCUMENTS 2,775,010 A * 12/1956 Bedford, Jr. ........ B60R 13/0206
 24/581.11
2,903,815 A * 9/1959 Van Buren, Jr. .... B60R 13/0206
 52/511

(Continued)

FOREIGN PATENT DOCUMENTS

JP S47-26606 U1 11/1972
JP S58-002403 U1 1/1983
(Continued)

OTHER PUBLICATIONS

JPO Decision to Grant dated Jun. 14, 2016 with an English translation thereof.

(Continued)

*Primary Examiner* — Matthieu F Setliff
(74) *Attorney, Agent, or Firm* — McGinn IP Law Group, PLLC.

(57) ABSTRACT

A first member has through holes. A linking member has a first holding portion and a second holding portion that hold an inner circumferential face and outer circumferential face of the first member; and engaging protrusions are formed on the first holding portion and second holding portion. The engaging protrusions are inserted into the through holes, and joined by joining portions formed thereupon. An attaching portion continues to the base edges of the first holding portion and second holding portion via a first supporting portion and a second supporting portion.

5 Claims, 9 Drawing Sheets

(58) Field of Classification Search
CPC ............ Y10T 403/606; Y10T 403/608; Y10T 24/307; Y10T 24/44017; Y10T 24/44983; F16B 2/24; F16B 2/22; F16B 2/20
USPC ............... 293/136; 296/210, 203.03, 29, 30; 29/251
See application file for complete search history.

(56) References Cited

U.S. PATENT DOCUMENTS

| | | | | |
|---|---|---|---|---|
| 3,909,919 | A * | 10/1975 | Miyabayashi | B21D 39/021 29/509 |
| 4,621,661 | A * | 11/1986 | Greiner | B21D 39/031 138/172 |
| 6,029,334 | A * | 2/2000 | Hartley | B21D 39/021 29/464 |
| 6,037,559 | A | 3/2000 | Okabe et al. | |
| 6,254,161 | B1 * | 7/2001 | Wochaski | F16B 37/041 248/225.11 |
| 6,718,599 | B2 * | 4/2004 | Dickinson | F16B 5/0614 24/289 |
| 7,162,788 | B2 * | 1/2007 | Inch | A47L 15/0092 29/450 |
| 7,188,392 | B2 * | 3/2007 | Giugliano | F16B 5/065 24/295 |
| D619,878 | S * | 7/2010 | Sjoqvist | D8/354 |
| D640,916 | S * | 7/2011 | Sias | D8/382 |
| 8,469,438 | B2 * | 6/2013 | Mazur | B60R 13/0206 24/293 |
| 2010/0219305 | A1 * | 9/2010 | Lloyd | B01D 46/001 248/201 |
| 2012/0012239 | A1 | 1/2012 | Fuchs et al. | |
| 2015/0000956 | A1 * | 1/2015 | Spinella | B23K 11/20 174/126.2 |

FOREIGN PATENT DOCUMENTS

| | | |
|---|---|---|
| JP | H07-137655 A | 5/1995 |
| JP | H08-268334 A | 10/1996 |
| JP | H09-085454 A | 3/1997 |
| JP | 2003-236673 A | 8/2003 |
| JP | 2004-352092 A | 12/2004 |
| JP | 2005-225252 A | 8/2005 |
| JP | 2010-240678 A | 10/2010 |
| JP | 2013-216169 A | 10/2013 |
| JP | 2015-066570 A | 4/2015 |
| WO | WO 2012/147684 A1 | 11/2012 |

OTHER PUBLICATIONS

JPO Notification of Refusal dated Oct. 27, 2015 with an English translation thereof.
German Office Action dated Jul. 20, 2017 in German Application No. 102015104121 with an English translation thereof.

* cited by examiner

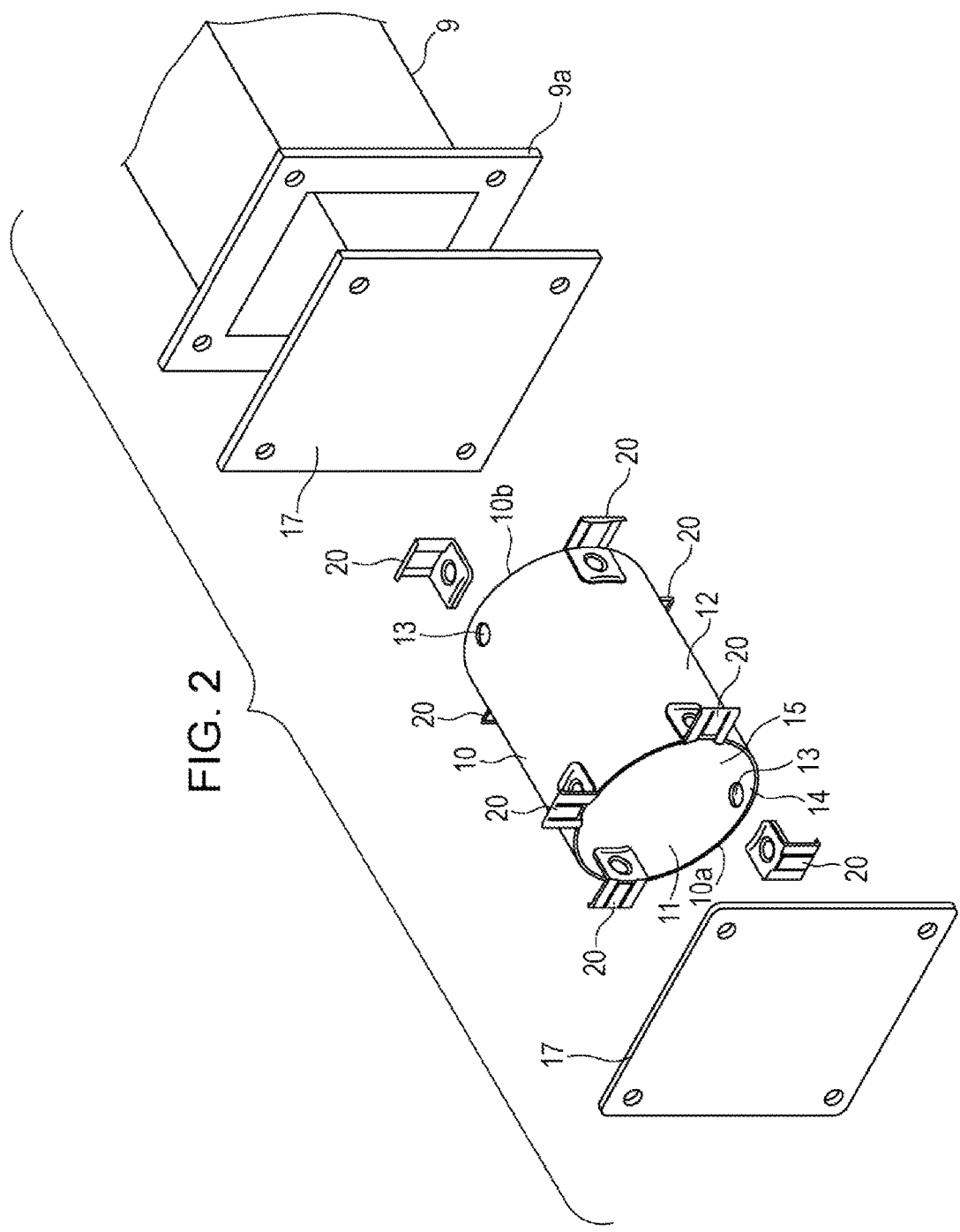

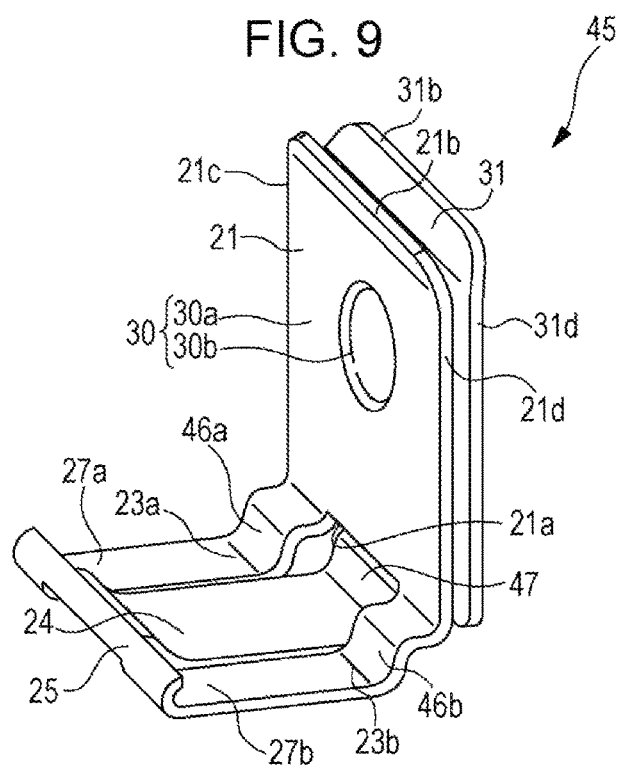
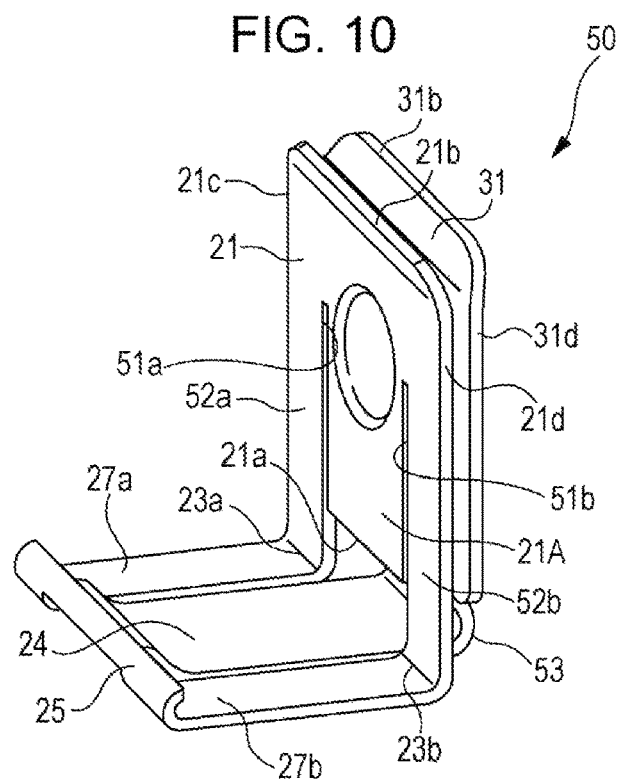

MEMBER JOINING STRUCTURE

CROSS-REFERENCE TO RELATED APPLICATIONS

The present application claims priority from Japanese Patent Application No. 2014-068387 filed on Mar. 28, 2014, the entire contents of which are hereby incorporated by reference.

BACKGROUND

1. Technical Field

The present invention relates to a member joining structure, and more particularly relates to a member joining structure where members are joined by a linking material.

2. Related Art

Spot-welding dissimilar materials of different nature, such as an iron-based metal plate and an aluminum alloy plate or resin material or the like, often does not yield a satisfactory bond, due to difference in the electric conductivity, thermal conductivity, melting point, and so forth, of the different materials.

Japanese Unexamined Patent Application Publication No. 2003-236673 attempts to address this issue by a dissimilar material welding method, where an aluminum alloy plate is interposed between two iron-based metal sheets, more specifically two steel sheets, to form a layered article of three layers, and the layered portion is held between a pair of electrodes of a spot welder and welded. This spot welding is performed by applying a strong electric current between upper and lower electrodes holding the layered portion by a predetermined pressure, thereby rapidly melting the aluminum alloy sheet that is the middle layer, and eliminating the molten portion of the aluminum alloy sheet from the spot welding region, thus, directly welding the steel sheets. Thus, the two steel sheets are directly spot-welded, so the bonding strength therebetween is sufficient, and further, the aluminum alloy sheet is strongly bonded to the two steel sheets.

On the other hand, in a case of attaching a member that requires deformation, such as a shock absorbing member that absorbs a shock load through deformation for example, to an automobile body member, the linkage of the shock absorbing member to the automobile body member needs to be maintained in a sure manner while allowing deformation of the shock absorbing member. There are many other structures used in joining other automobile body members as well, where linkage needs to be maintained in a sure manner while allowing deformation of the member when a load is placed thereupon.

There are cases where strongly bonding a member that has to deform restricts the deformation of the member at the bonding portion so that deformation over the entire member is inhibited, and functions according to the deformation of the member are not sufficiently manifested. For example, a shock absorbing member may have its deformability restricted at the bonding portion, such that the shock absorbing functions due to the deformation of the entire shock absorbing member may not be manifested. Moreover, strongly bonding such members may result in load stress being concentrated at the bond portion and surrounding portions when shock is applied, which may even result in rupture and other such damage.

SUMMARY OF THE INVENTION

The present invention has been made in light of the above-described problem, and accordingly it is an object thereof to provide a member joining structure capable of maintaining a joined state in a reliable manner while allowing deforming of members.

An aspect of the present invention provides a member joining structure that joins a first member and a second member by a linking member interposed therebetween. The first member has at least one through hole. The linking member includes: a first holding portion and a second holding portion, which are plate shaped having a side edge and continuing from a base edge to a tip edge, and face one another and hold the first member; an engaging protrusion that is provided on at least either one of the first holding portion and the second holding portion at a position away from the side edges, and is inserted into the at least one through hole and joined to the other holding portion; an attaching portion that is attachable to the second member; a first supporting portion that links the base edge of the first holding portion to the attaching portion; and a second supporting portion that links the base edge of the second holding portion to the attaching portion.

The linking member may includes: the first holding portion and second holding portion, which face each other and upon at least either one of which the engaging protrusion has been formed; the first supporting portion extending to the base edge of the first holding portion; the attaching portion extended to the first supporting portion via a fold portion; and the second supporting portion extending from the base edge of the second holding portion, and linked to the attaching portion via a fold portion.

The linking member may include: the first holding portion and second holding portion, which face each other and upon at least either one of which the engaging protrusion has been formed; the first supporting portion extending to the base edge of the first holding portion; the attaching portion, extending from the first supporting portion in a direction away from the second holding portion, via a fold portion; a pair of side extensions extending from a fold-back portion continuously formed from the attaching portion, that extend following both sides of the attaching portion; and a pair of the second supporting members each extending from the side extensions via fold portions, continuing to the base edge of the second holding portion.

The side extensions may be curved in an extending direction thereof.

The linking member may include: the first holding portion and second holding portion, which face each other and upon at least either one of which the engaging protrusion has been formed; a pair of the first supporting portions, each extending in a stepped form to both edges of the base edge of the first holding portion; a pair of side extensions formed extending in a direction away from the second holding portion, via the first supporting portion and fold portion; the attaching portion, extending from a fold-back portion formed continuously from both side extensions, following both side extensions; and the second supporting portion extended in a stepped form via the attaching portion and fold portion, and continuing to the base edge of the second holding portion.

The linking member may include: the first holding portion and second holding portion, which face each other and upon at least either one of which the engaging protrusion has been formed; a pair of the first supporting portions divided by side slits formed following each side edge of the first holding portion, the pair of the first supporting portions extending following each side edge and protruding beyond the base edge; a pair of side extensions formed extending in a direction away from the second holding portion, via the first supporting portion and fold portion; the attaching portion, extending from a fold-back portion formed continuously from both side extensions, following both side extensions; and the second supporting portion extended from the attaching portion and continuing to the base edge of the second holding portion.

The first holding portion may have a slit formed extending on at least either one of the base edge and the tip edge.

BRIEF DESCRIPTION OF THE DRAWINGS

FIG. 2 is a disassembled perspective view illustrating an overview of the member joining structure according to the implementation.

FIGS. 4A through 4C are explanatory diagrams of a joining procedure of the attaching member and a shock absorbing member, in which FIG. 4A illustrates a linking member mounting procedure, FIG. 4B illustrates a linking member fixing procedures, and FIG. 4C illustrates an attaching procedure.

FIGS. 5A through 5C are explanatory diagrams of a joining procedure of the attaching member and a shock absorbing member, in which FIG. 5A illustrates a linking member mounting procedure, FIG. 5B illustrates a linking member fixing procedures, and FIG. 5C illustrates an attaching procedure.

FIG. 9 is a schematic perspective view illustrating another modification of the attaching member.

FIG. 10 is a schematic perspective view illustrating another modification of the attaching member.

DETAILED DESCRIPTION

Figure 1:
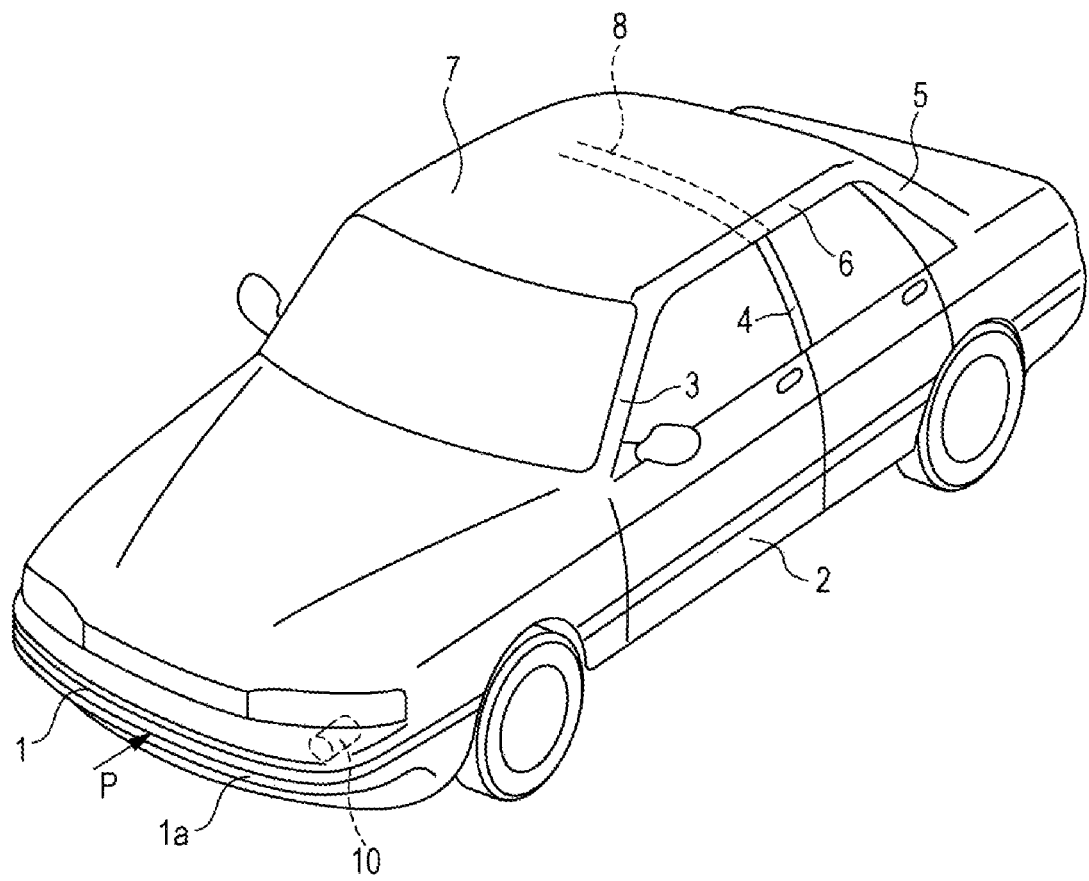
FIG. 1 is a perspective view of a vehicle illustrating an example of applicable portions where member joining structures according to an implementation are used.

An implementation of a member joining structure according to the present invention will be described. The member joining structure according to the present invention can be applied to a member joining portion of a vehicle, for example. FIG. 1 is a schematic perspective view of a vehicle, as an example of applicable portions of an implementation of the member joining structure according to the present invention.

A bumper 1 is disposed extending in the lateral direction of a vehicle at the front thereof. Side sills 2 extend in the longitudinal direction of the vehicle at the lower part of a passenger compartment, and A pillars 3, B pillars 4, and C pillars 5 extend upwards from the front, middle, and rear parts of the side sill 2. The upper ends of the A pillars 3, B pillars 4, and C pillars 5 tie into left and right side rails 6, across which a roof panel 7 is laid, as illustrated in FIG. 1.

End portions of a roof brace 8 extending laterally underneath the roof panel 7 are joined to the left and right side rails 6. The joining structure of the roof brace 8 and the side rails 6 will be described later.

The bumper 1 that extends in the lateral direction at the front of the vehicle is configured including a steel bumper beam that is an iron-based metal member extending in the lateral direction of the vehicle, a shock absorbing material such as foamed resin or the like disposed on the front face of the bumper beam, a bumper face 1a that covers the shock absorbing material, and so forth. Portions of the bumper beam near to the ends thereof are joined to the front ends of left and right side members, which are body structural members, via shock absorbing members 10 that is a first member, and the like.

FIG. 2 is a schematic disassembled perspective view of a joining portion that joins the bumper 1 using the shock absorbing member 10 and a side member 9. The shock absorbing member 10 has a cylindrical shape including an inner circumferential face 11 and an outer circumferential face 12. The shock absorbing member 10 extends longitudinally, and is formed from carbon fiber reinforced plastic (CFRP) that is both light and strong, for example. Multiple, four in the implementation, through holes 13 are formed equidistantly following a front edge 10a that is one end of the shock absorbing member 10. In the same way, four through holes 13 are formed equidistantly following a rear edge 10b. These through holes 13 have cross-sectional circular shapes, and continue from the inner circumferential face 11 side to the outer circumferential face 12 side. For sake of convenience, the region between the through holes 13 and the front edge 10a will be referred to as an end portion 14, and a nearby range of the through holes 13 will be referred to as a through hole perimeter portion 15.

An attachment plate 17 formed of an iron based metal that can be welded, that is, steel. The attachment plate 17 is joined to the front edge portion of the shock absorbing member 10 using four linking members 20. The rear edge portion of the shock absorbing member 10 is also joined to an attachment plate 17 by four linking member 20.

The attachment plate 17 at the front side is fastened by bolts, for example, to the bumper beam of the bumper 1, and the attachment plate 17 at the rear side is fastened by bolts to an attachment flange 9a formed at the front end of the side member 9. The bumper 1 is thus attached to and supported by the front end of the side member 9 via the shock absorbing member 10.

Figure 3A:
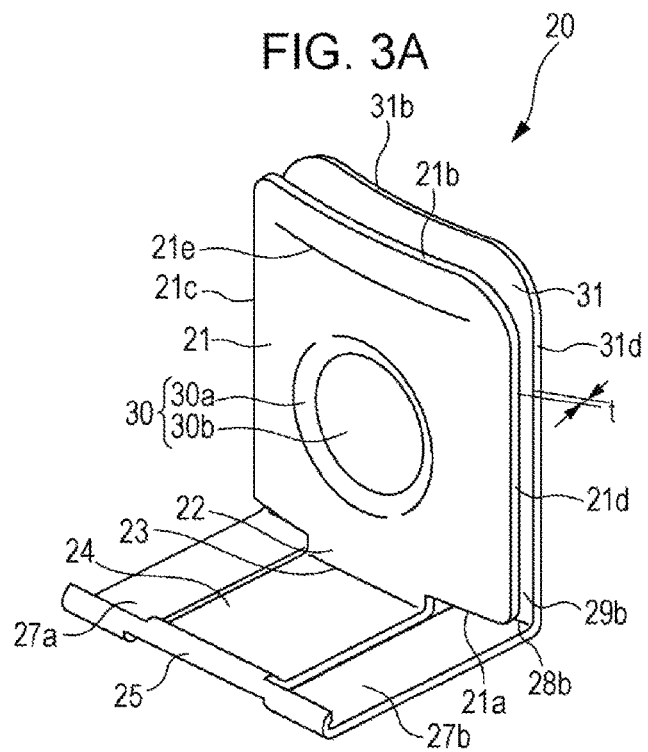
FIG. 3A is a perspective view illustrating an overview of an attaching member according to the implementation.
Figure 3B:
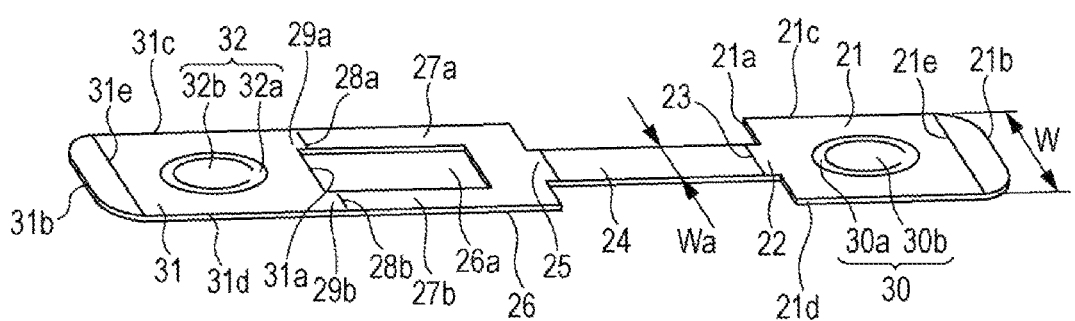
FIG. 3B is an unfolded view of the attaching member.

The linking members 20 that link the shock absorbing member 10 to the attachment plates 17 will be described with reference to FIGS. 3A through 6B. FIG. 3A is a perspective view of the linking member 20, and FIG. 3B is an unfolded perspective view of the linking member 20.

The linking member 20 has a first holding portion 21 and a second holding portion 31 that can be laid on the outer circumferential face 12 and inner circumferential face 11 of the shock absorbing member 10 in a layered manner, with a gap therebetween corresponding to a thickness t of the shock absorbing member 10. The first holding portion 21 is formed in a rectangular plate shape having a base edge 21a and a tip edge 21b, and side edges 21c and 21d extended from both ends of the base edge 21a to both ends of the tip edge 21b. The second holding portion 31 similarly is formed in a rectangular plate shape having side edges 31c and 31d extended from both ends of a base edge 31a to both ends of a tip edge 31b.

A first supporting portion 22, a fold portion 23, and an attaching portion 24, are formed continuously. The first supporting portion 22 is formed as a plate having a smaller width Wa that the width W of the first holding portion 21, and extending continuously from the width-wise middle portion of the base edge 21a of the first holding portion 21.

The fold portion 23 has the same width as that of the first supporting portion 22, and is bent away from the second holding portion 31. The attaching portion 24 is continuously formed from the first supporting portion 22 via the fold portion 23.

A fold-back portion 25 is formed continuously from the tip of the attaching portion 24. An extension 26, which has the same width as the width W of the first holding portion 21 and the second holding portion 31, extends from the attaching portion 24 via the fold-back portion 25.

The extension 26 has a rectangular opening 26a that is somewhat wider than the width Wa of the attaching portion 24 into which the attaching portion 24 can be inserted, and side extensions 27a and 27b are formed on the sides of the opening 26a. Fold portions 28a and 28b are formed at the tips of the side extensions 27a and 27b. Second support portions 29a and 29b are formed as flat plate forms continuing to both ends of a base edge 31a of the second holding portion 31. The first holding portion 21, second holding portion 31, first supporting portion 22, attaching portion 24, fold-back portion 25, side extensions 27a and 27b, and second support portions 29a and 29b, are formed integrally and continuously. The side extensions 27a and 27b and the fold portions 23, 28a, and 28b maintain their respective shapes under normal conditions, but in a case where a load of a predetermined value or greater is input, the side extensions 27a and 27b flex, and the fold portion 23 is deformed by crushing so that the first supporting portion 22 moves away from the second holding portion 31. Also, the fold portions 28a and 28b are deformed by crushing so that the second support portions 29a and 29b move away from the first holding portion 21.

A first engaging protrusion 30 that is cylindrical in shape and has a base face, is formed at the middle portion of the first holding portion 21, at a position away from the base edge 21a, tip edge 21b, and side edges 21c and 21d. A second engaging protrusion 32 is formed in the same way at the middle portion of the second holding portion 31, at a position away from the base edge 31a, tip edge 31b, and side edges 31c and 31d.

The first engaging protrusion 30 has an outer circumferential face 30a that can be fit into a through hole 13 formed in the shock absorbing member 10, and a joining portion 30b at the apex thereof. In the same way, the second engaging protrusion 32 has an outer circumferential face 32a that can be fit into a through hole 13 formed in the shock absorbing member 10, and a joining portion 32b capable of contact with the joining portion 30b. The tip edge 21b and tip edge 31b of the first holding portion 21 and second holding portion 31 are each formed so as to tilt away from each other due to fold portions 21e and 31e.

The linking member 20 thus configured can easily be manufactured by folding the flat plate member such as illustrated in its unfolded state in FIG. 3B, by pressing. That is to say, The linking member 20 can easily be formed by folding the flat plate member where the first holding portion 21 in which the first engaging protrusion 30 has been formed, the first supporting portion 22, the attaching portion 24, the extension 26 in which the opening 26a has been formed, and the second holding portion 31 where the second engaging protrusion 32 has been formed, are continuously formed, on the fold portions 28a, 28b, 21e, 31e, and folding back at the fold-back portion 25.

Next, procedures to join the shock absorbing member 10 and the attachment plate 17 using the linking members 20 will be described with reference to FIGS. 4A through 5C.

Figure 4A:
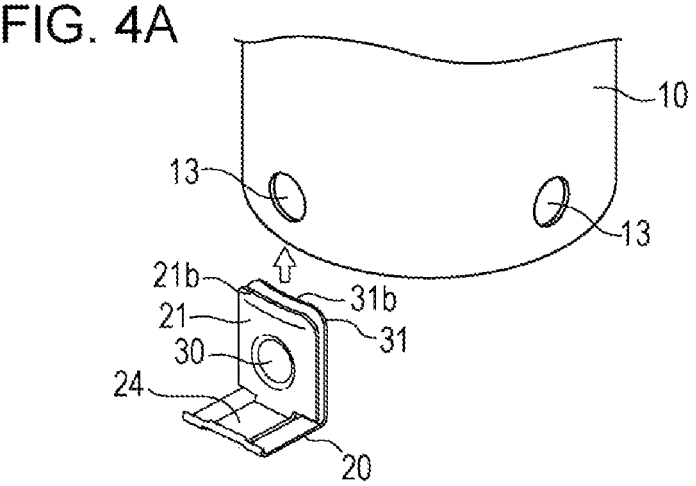
Figure 5A:
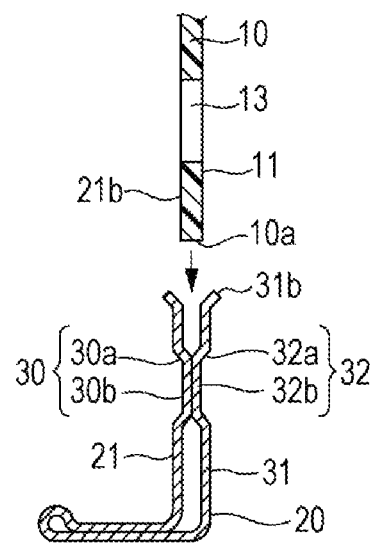

First, in a linking member mounting procedure, the tip edges 21b and 31b of the first holding portion 21 and second holding portion 31 of the linking member 20 are positioned at the front edge 10a of the shock absorbing member 10 so as to face each other, as illustrated in FIGS. 4A and 5A. Once positioned, the shock absorbing member 10 is inserted from the front edge 10a side into between the first holding portion 21 and second holding portion 31, the first engaging protrusion 30 formed on the first holding portion 21 is inserted into the through hole 13 from the outer circumferential face 12 side so that the first holding portion 21 is overlaid on the outer circumferential face 12, and the second engaging protrusion 32 formed on the second holding portion 31 is inserted into the through hole 13 from the inner circumferential face 11 side, so that the second holding portion 31 is overlaid on the inner circumferential face 11. Thus, the linking member 20 is attached to the front edge 10a in a sure manner, by the first holding portion 21 and the second holding portion 31 holding the shock absorbing member 10 from the outer circumferential face 12 side and the inner circumferential face 11 side.

The work of mounting the linking member 20 to the shock absorbing member 10 is easy, since the first holding portion 21 is connected to the relatively narrow attaching portion 24 and first supporting portion 22 extending from the fold-back portion 25, and the second holding portion 31 that faces the first holding portion 21 is connected to the relatively narrow side extensions 27a and 27b and second support portions 29a and 29b extending from the fold-back portion 25, so the first holding portion 21 and second holding portion 31 can be readily distanced from each other. In other words, the linking member 20 can be unclasped and easily mounted to the shock absorbing member 10.

Figure 4B:
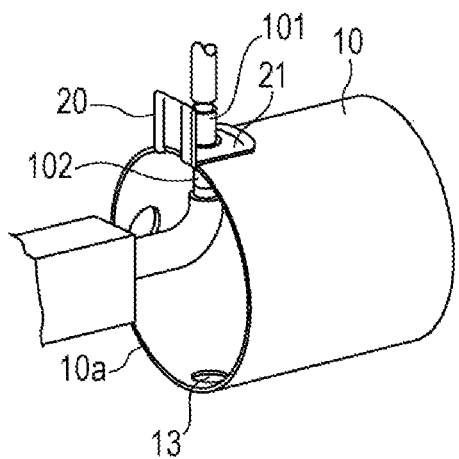
Figure 5B:
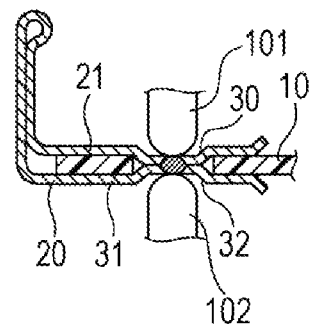

Next, in a linking member fixing procedure, the joining portion 30b of the first engaging protrusion 30 and joining portion 32b of the second engaging protrusion 32 that have been fit into the through hole 13 of the shock absorbing member 10 and are into contact with each other, are held under a predetermined pressure by a pair of electrodes 101 and 102 of a welder, and welded by electroconduction, as illustrated in FIGS. 4B and 5B.

The joining here is sure in this spot welding, since two steel sheets are directly welded by spot welding. The shock absorbing member 10 is strongly held from the outer circumferential face 12 side and the inner circumferential face 11 side by the first holding portion 21 and second holding portion 31, on which are formed the first engaging protrusion 30 and second engaging protrusion 32 that have been inserted into the through hole 13 and joined. Thus, the linking member 20 and the shock absorbing member 10 are strongly joined.

Figure 4C:
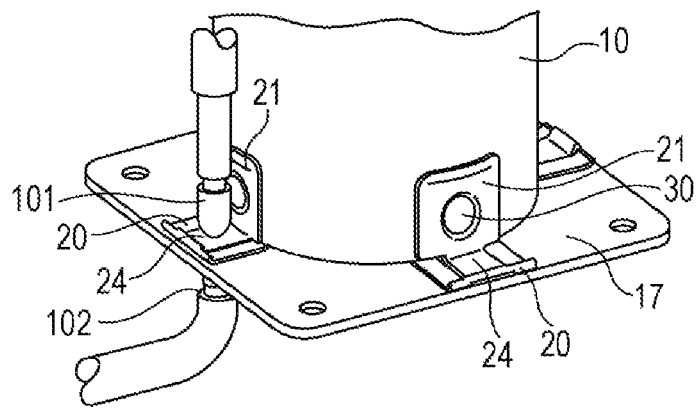
Figure 5C:
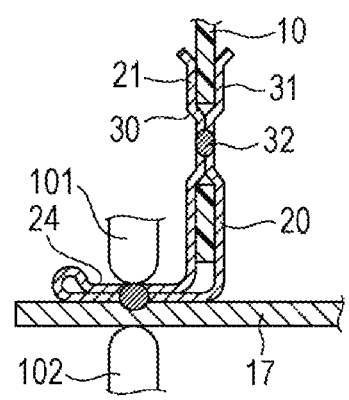

In a subsequent attaching procedure, the shock absorbing member 10 to which linking members 20 have been attached corresponding to the through holes 13 is attached to the attachment plate 17. This is performed by the attaching portions 24 of the linking members 20 attached to the shock absorbing member 10 being placed on the attachment plate 17, and the attachment plate 17 and attaching portions 24 are held under a predetermined pressure by the pair of electrodes 101 and 102 of the welder, and welded by electroconduction, as illustrated in FIGS. 4C and 5C.

The joining here is sure in this spot welding, since the steel attachment plate 17 and the steel linking members 20 are directly welded by spot welding. Thus, the shock absorbing member 10 is strongly joined to the attachment plate 17 by way of the linking members 20.

The linking member 20 configured this way is strongly linked to the shock absorbing member 10 by the first engaging protrusion 30 and second engaging protrusion 32 inserted into the through hole 13 being strongly joined. On the other hand, the base edges 21a and 31a, tip edges 21b and 21b, and side edges 21c and 31c, and 21d and 31d, which are on the perimeter edges and face one another are not linked with each other, but rather easily deformed so as to be distanced from each other under a relatively small load. Deformation without constraint by the through hole perimeter portion 15 of the shock absorbing member 10 is permitted.

Thus, the shock absorbing member 10 to which attachment plates 17 have been attached on either end with linking members 20 interposed therebetween is fastened by bolting, for example, to the bumper beam of the bumper 1 as illustrated in FIG. 2. The attachment plates 17 at the rear side are fastened by bolting to attachment flanges 9a of the side members, and thus are disposed between the bumper 1 and the front end of the side members 9.

When the bumper 1 is subjected to a shock load P of a predetermined lever or greater, due to a collision or the like for example, the shock absorbing member 10 disposed thus exhibits crushing or compression deformation and absorbs the input load input from the attachment plates 17 via the linking members 20 die to relative backward movement of the bumper 1, and reactive load from the linking members 20 supported by the attachment plates 17 disposed at the front ends of the side members 9.

Figure 6A:
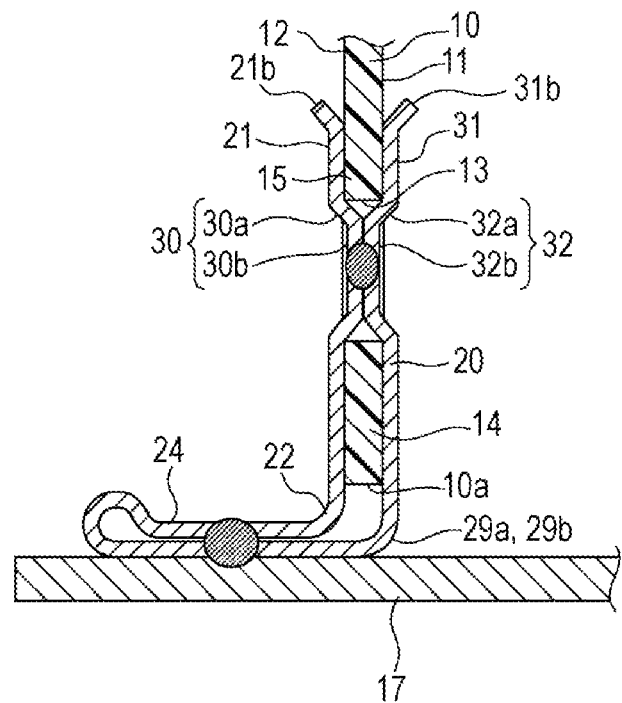
FIGS. 6A and 6B are operation explanatory diagrams.

The operations of the linking members 20 configured in this way will be described with reference to the schematic illustrations in FIGS. 6A and 6B. The first engaging protrusion 30 of the first holding portion 21 and the second engaging protrusion 32 of the second holding portion 31 extending from the attaching portion 24 welded to the attachment plate 17 are inserted into a through hole 13 of the shock absorbing member 10 and the joining portions 30b and 32b thereof are welded, as illustrated in FIG. 6A. Also, the inner circumferential face 11 and outer circumferential face 12 of the shock absorbing member 10 are firmly held by first holding portion 21 and second holding portion 31, so that the shock absorbing member 10 is strongly attached to and supported by the attachment plate 17.

Figure 6B:
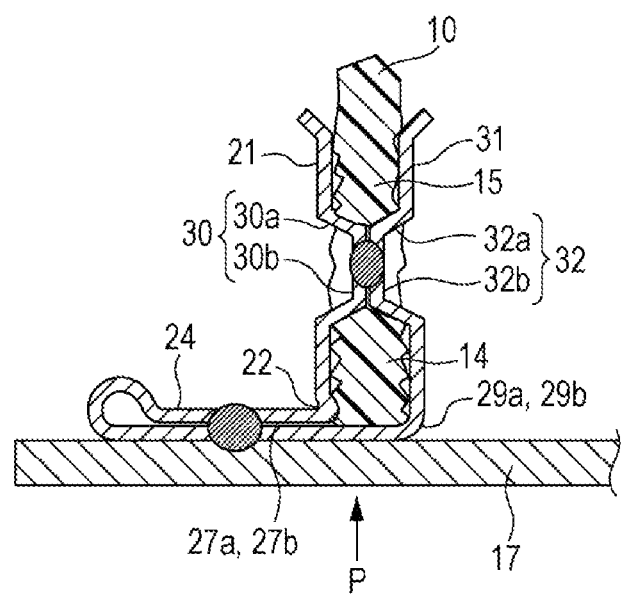

On the other hand, when a shock load P exceeding the predetermined value is input to the attachment plate 17 at the bumper 1 side, the end portion 14 between the through hole 13 and the front edge 10a is crushed, between the attachment plate 17, or more particularly the side extensions 27a and 27b, and the first engaging protrusion 30 and second engaging protrusion 32 inserted into the through hole 13, as illustrated in FIG. 6B. At this time, the fold portion 23 provided between the attaching portion 24 attached to the attachment plate 17, and the fold portions 28a and 28b provided between the attaching portion 24 and the first holding portion 21 and second holding portion 31, exhibit crushing deformation such that they separated from each other as if being unclasped. Thus, the first supporting portion 22 and the second support portions 29a and 29b fall away such that the base edge 21a of the first holding portion 21 and the base edge 31a of the second holding portion 31 separate from each other. Accordingly, the end portion 14 can freely be crushed and deformed without constraint.

Also, the nearby range of the through hole 13 pressed by the first engaging protrusion 30 and second engaging protrusion 32, i.e., the through hole perimeter portion 15, is crushed. The first holding portion 21 and second holding portion 31 are opened over the range of the side edges 21c and 31c, and 21d and 31d, to the tip edges 21b and 31b, so the tip edges 21b and 31b and side edges 21c and 31c, and 21d and 31d, of the first holding portion 21 and second holding portion 31, readily deform in the direction of being distanced from each other, so the through hole perimeter portion 15 is sufficiently deformed by crushing without constraint. In this state as well, the joined state of the first engaging protrusion 30 and second engaging protrusion 32 joined within the through hole 13 of the shock absorbing member 10 is maintained, so the joining of the shock absorbing member 10, linking member 20, and attachment plate 17 is maintained in a sure manner.

Permitting this deformation of the shock absorbing member 10 avoids destruction and the like of the shock absorbing member 10, since stress is not locally concentrated at the through hole perimeter portion 15 of the through hole 13 where the first engaging protrusion 30 and second engaging protrusion 32 are inserted, and the attachment range held between the first holding portion 21 and second holding portion 31, when shock load P acts thereupon.

Accordingly, the shock absorbing member 10 is held by the linking members 20 and so forth in a stable manner under normal conditions, and on the other hand, in a case where shock load or the like is input, the shock absorbing member 10 can exhibit sufficient shock absorbing functions due to deformation of the entirety thereof, without deformation of the shock absorbing member 10 being locally constrained by the linking member 20. The side extensions 27a and 27b can also be spot welded to the attachment plate 17 so as to bond the linking members 20 to the attachment plate 17 even more firmly.

Now, modifications of the linking member 20 according to the present invention will be described with reference to FIGS. 7 through 10. Note that the same reference numerals will be used as in the above-described FIGS. 1 through 6B, even though illustration of some parts may be omitted for sake of convenience.

Figure 7:
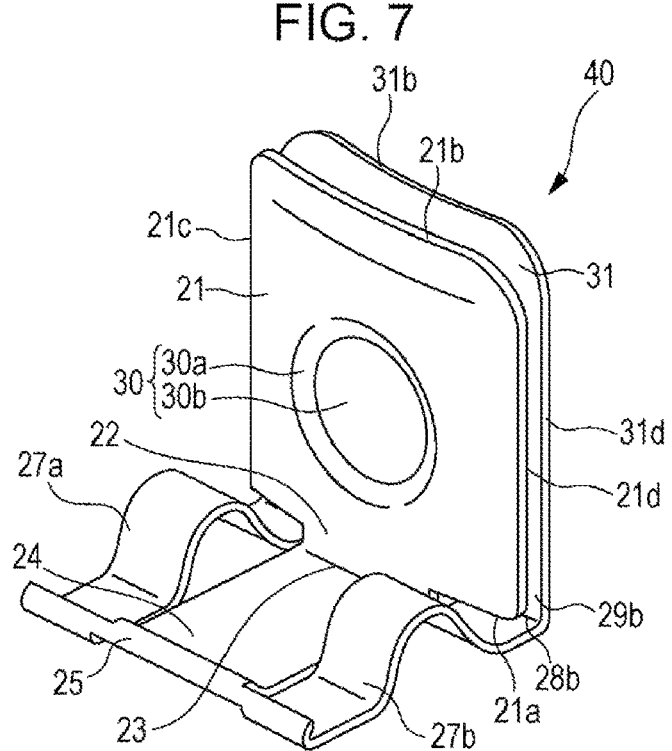
FIG. 7 is a schematic perspective view illustrating a modification of the attaching member.

The linking member 40 illustrated in FIG. 7 differs from the linking member 20 illustrated in FIG. 3A with regard to the configuration of the side extensions 27a and 27b, and other configurations are the same. This linking member 40 has side extensions 27a and 27b, which bridge between the fold-back portion 25 and the fold portions 28a and 28b from which continue the second support portions 29a and 29b, formed so as to curve such that the middle portion in the length direction thereof gradually rises. The side extensions 27a and 27b thus formed maintain their form under normal conditions, but once a load of a certain value or greater is input, deform by curving or starching, thus functioning as a weak portion that stretches and shrinks between the fold-back portion 25 and the fold portions 28a and 28b.

The linking member 40 thus configured has, under normal conditions, the first engaging protrusion 30 of the first holding portion 21 and the second engaging protrusion 32 of the second holding portion 31 inserted into the through hole 13 of the shock absorbing member 10 and the joining portions 30b and 32b thereof joined by welding. Also, the shock absorbing member 10 is held from the inner circumferential face 11 and outer circumferential face 12 side by the first holding portion 21 and second holding portion 31, so that the shock absorbing member 10 is strongly attached to and supported by the attachment plate 17.

On the other hand, in a case where a shock load is input, the end portion 14 is crushed between the attachment plate 17, side extensions 27a and 27b, and first engaging protrusion 30 and second engaging protrusion 32 inserted into the through hole 13. At this time, the fold portion 23 between the attaching portion 24, and the fold portions 28a and 28b between the side extensions 27a and 27b and the second support portions 29a and 29b separate from each other, and also the side extensions 27a and 27b that have been formed curved deform by stretching, so that the base edge 21a of the first holding portion 21 and the base edge 31a of the second holding portion 31 separate from each other. Accordingly, sufficient deformation of the end portion 14 is secured without being constrained.

Also, the through hole perimeter portion 15 of the through hole 13, at the tip edges 21b and 31b pressed by the first engaging protrusion 30 and second engaging protrusion 32, is crushed. The first holding portion 21 and second holding portion 31 are opened over the range of the side edges 21c and 31c, and 21d and 31d, to the tip edges 21b and 31b, so these readily separate from each other, and deformation of the through hole perimeter portion 15 is permitted. That is to say, sufficient shock absorbing functions of the shock absorbing member 10 can be secured, due to deformation of the entirety thereof, without deformation of the shock absorbing member 10 being locally constrained by the linking member 20.

Figure 8:
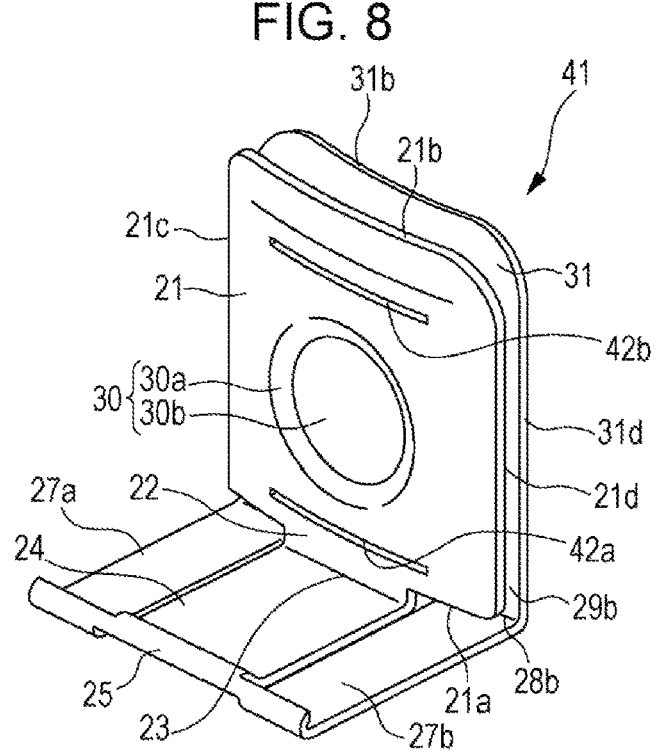
FIG. 8 is a schematic perspective view illustrating another modification of the attaching member.

A linking member 41 illustrated in FIG. 8 differs from the linking member 20 illustrated in FIG. 3A with regard to the point that a slit extending in the width direction is formed in the first holding portion 21 and second holding portion 31, and other configurations are the same. The linking member 41 has a base side slit 42a opened extending generally parallel to the base edge 21a in the width direction, between the first engaging protrusion 30 of the first holding portion 21 and the base edge 21a, and a tip side slit 42b opened extending generally parallel to the tip edge 21b in the width direction, between the first engaging protrusion 30 and the tip edge 21b. In the same way, the linking member 41 has an unillustrated base side slit 43a opened in the width direction, between the second engaging protrusion 32 of the second holding portion 31 and the base edge 31a, and an unillustrated tip side slit 43b opened in the width direction, between the second engaging protrusion 32 and the tip edge 31b.

The first holding portion 21 and second holding portion 31 maintain their forms under normal conditions, but in a case where a load of a predetermined value or greater is input from between the first holding portion 21 and the second holding portion 31, that is to say from the inner side, the first holding portion 21 and second holding portion 31 that have been divided by the base side slits 42a and 43a can be deformed such that the base edges 21a and 31a move away from each other, and in the same way the tip edges 21b and 31b of the first holding portion 21 and second holding portion 31 divided by the tip side slits 42b and 43b can be deformed such that the tip edges 21b and 31b move away from each other.

The linking member 41 thus configured has, under normal conditions, the first engaging protrusion 30 of the first holding portion 21 and the second engaging protrusion 32 of the second holding portion 31 inserted into the through hole 13 of the shock absorbing member 10 and the joining portions 30b and 32b thereof joined by welding. Also, the shock absorbing member 10 is held from the inner circumferential face 11 and outer circumferential face 12 side by the first holding portion 21 and second holding portion 31, so that the shock absorbing member 10 is strongly attached to and supported by the attachment plate 17.

On the other hand, in a case where a shock load is input, the end portion 14 is crushed between the attachment plate 17, side extensions 27a and 27b, and first engaging protrusion 30 and second engaging protrusion 32 inserted into the through hole 13. At the time of the through hole perimeter portion 15 of the through hole 13 being crushed, the fold portion 23 between the attaching portion 24 and first supporting portion 22, and the fold portions 28a and 28b between the side extensions 27a and 27b and the second support portions 29a and 29b separate from each other by crushing deformation, and also the so the base edge 21a and 31a sides and tip edge 21b and 31b sides of the first holding portion 21 and second holding portion 31 that have been formed in a slender shape due to the base side slits 42a and 43a and the tip side slits 42b and 43b are readily opened, and deformation of the through hole perimeter portion 15 is permitted. That is to say, the shock absorbing member 10 can exhibit sufficient shock absorbing functions due to deformation of the entirety thereof, without deformation of the shock absorbing member 10 being locally constrained by the linking member 41. Note that part of the base side slits 42a and 43a and the tip side slits 42b and 43b may be omitted as appropriate.

A linking member 45 illustrated in FIG. 9 has the first holding portion 21 where the first engaging protrusion 30 has been formed, and the second holding portion 31 where the second engaging protrusion 32 has been formed, in the same way as the linking member 20 illustrated in FIG. 3A. First supporting portions 46a and 46b are provided in a stepped form on both edges of the base edge 21a of the first holding portion 21, with the first supporting portions 46a and 46b continuing to the fold-back portion 25 via fold portions 23a and 23b and the rectangular side extensions 27a and 27b. The second holding portion 31 has a second supporting portion 47 formed by folding the middle portion of the base edge 31a in a stepped shape, continuing to the middle portion of the fold-back portion 25 via the rectangular attaching portion 24.

The first supporting portions 46a and 46b and the second supporting portion 47 maintain their shapes under normal conditions, but in a case where a load of a predetermined value or greater is input, the base edges 21a and 31a sides of the first holding portion 21 and second holding portion 31 deform in a direction separating from each other. Also, movement in the buckling direction of the first supporting portions 46a and 46b and the second supporting portion 47 formed in stepped shapes, which is in-plane movement of the first holding portion 21 and second holding portion 31, is facilitated.

The through hole perimeter portion 15 at the side of the tip edges 21b and 31b, pressed by the first engaging protrusion 30 and second engaging protrusion 32, is crushed. The side edges 21c and 31c, and 21d and 31d, of the first holding portion 21 and second holding portion 31 are open up to the tip edges 21b and 31b.

The linking member 45 thus configured has, under normal conditions, the first engaging protrusion 30 of the first holding portion 21 and the second engaging protrusion 32 of the second holding portion 31 inserted into the through hole 13 of the shock absorbing member 10 and the joining portions 30b and 32b thereof joined by welding. Also, the shock absorbing member 10 is held from the inner circumferential face 11 and outer circumferential face 12 side by the first holding portion 21 and second holding portion 31, so that the shock absorbing member 10 is strongly attached to and supported by the attachment plate 17.

On the other hand, in a case where a shock load is input, the end portion 14 at the through hole 13 and front edge 10a is crushed between the attachment plate 17, side extensions 27a and 27b, and first engaging protrusion 30 and second engaging protrusion 32 inserted into the through hole 13, and the through hole perimeter portion 15 pressed by the first engaging protrusion 30 and second engaging protrusion 32 is crushed. The first holding portion 21 and second holding portion 31 are open at the side edges 21c and 31c, and 21d and 31d, up to the tip edges 21b and 31b, and accordingly readily separate and deformation of the through hole perimeter portion 15 is permitted.

A linking member 50 illustrated in FIG. 10 has the first holding portion 21 where the first engaging protrusion 30 has been formed, and the second holding portion 31 where the second engaging protrusion 32 has been formed, in the same way as the linking member 20 illustrated in FIG. 3A. Side slits 51a and 51b are opened on both sides of the first holding portion 21 across the first engaging protrusion 30, formed from nearby the first engaging protrusion 30, extending following the side edges 21c and 21d, and reaching the base edge 21a. A slender first supporting portion 52a is formed interposed between the side edge 21c and the side slit 51a and protruding beyond the base edge 21a, and a slender first supporting portion 52b is formed interposed between the side edge 21d and the side slit 51b and protruding beyond the base edge 21a. The first supporting portions 52a and 52b continue to the fold-back portion 25 via the fold portions 23a and 23b and the side extensions 27a and 27b.

On the other hand, a second supporting portion 53 is formed at the middle of the base edge 31a of the second holding portion 31, bulging in a cross-sectional arc shape away from the second holding portion 31. The second supporting portion 53 continues to the middle portion of the fold-back portion 25 via the rectangular attaching portion 24.

The first supporting portions 52a and 52b, and second supporting portion 53 maintain their shapes under normal conditions, but in a case where a load of a predetermined value or greater is input, the second supporting portion 53 and the fold portions 23a and 23b are deformed by crushing so as to move away from each other, and the first supporting portions 52a and 52b, and second supporting portion 53 can be deformed by flexure in the axial direction thereof. Also, a middle range 21A defined by the first engaging protrusion 30 isolated by the side slits 51a and 51 and the base edge 21a is readily deformed by curving so as to move away from the second holding portion 31 side.

The linking member 50 thus configured has, under normal conditions, the first engaging protrusion 30 of the first holding portion 21 and the second engaging protrusion 32 of the second holding portion 31 inserted into the through hole 13 of the shock absorbing member 10 and the joining portions 30b and 32b that are the tops thereof joined by welding. Also, the shock absorbing member 10 is held from the inner circumferential face 11 and outer circumferential face 12 side by the first holding portion 21 and second holding portion 31, so that the shock absorbing member 10 is strongly attached to and supported by the attachment plate 17.

On the other hand, in a case where a shock load is input, the end portion 14 at the through hole 13 and front edge 10a is crushed between the attaching portion 24 and the first engaging protrusion 30 and second engaging protrusion 32 inserted into the through hole 13, and the through hole perimeter portion 15 at the base edge 21a and 31a side pressed by the first engaging protrusion 30 and second engaging protrusion 32 is crushed. The second supporting portion 53 and fold portions 23a and 23b are deformed by crushing so as to move away from each other, and the first supporting portions 52a and 52b are deformed by crushing so as to move away from the second holding portion 31 side. The side edges 21c and 31c, and 21d and 31d, of the first holding portion 21 and second holding portion 31 are opened up to the tip edges 21b and 31b, and the middle range 21A deforms by curving away from the second holding portion 31, thus permitting deformation of the through hole perimeter portion 15.

Next, an example of joining a CFRP roof brace 8, serving as the first member, to the side rail 6, serving as a second member, will be described with reference to FIGS. 11A through 11C. A linking member that is essentially the same as the above-described linking members may be used as the linking members here. A linking member equivalent to the above-described linking member 20 will be described as an example.

The linking member in this implementation is essentially of the same configuration as the linking member 20 described above, except for a bolt hole 24a bored in the attaching portion 24 for attachment to the side rail, so detailed description will be omitted. Also, a pair of through holes 13 are bored at a side edge 8a of the roof brace 8, into which the first engaging protrusions 30 and second engaging protrusions 32 of the linking members 20 are inserted.

Figure 11A:
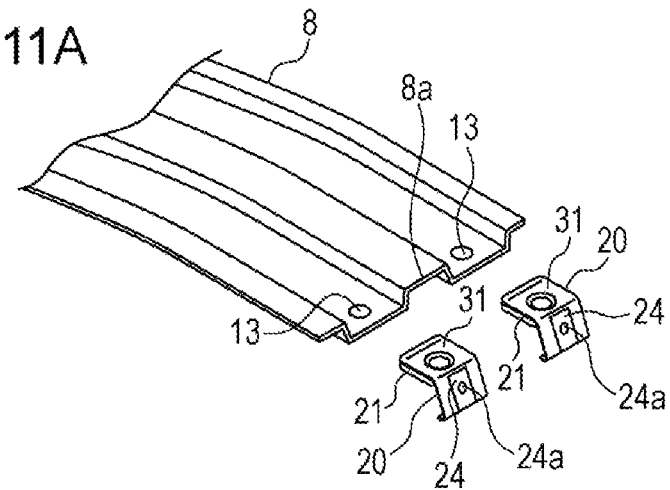
FIGS. 11A through 11C are diagrams illustrating an overview of joining a roof brace and a side rail.

First, in the linking member mounting procedure, the tip edges 21b and 31b of the first holding portion 21 and second holding portion 31 of the linking member 20 are positioned facing the side edge 8a of the roof brace 8 as illustrated in FIG. 11A. The side edge 8a of the roof brace 8 is inserted between the first holding portion 21 and second holding portion 31, the first engaging protrusion 30 formed on the first holding portion 21 is inserted into the through hole 13 so that the first holding portion 21 is overlaid on the lower face of the roof brace 8, and the second engaging protrusion 32 formed on the second holding portion 31 is inserted into the through hole 13 so that the second holding portion 31 is overlaid on the upper face thereof. Thus, the roof brace 8 is held at both faces by the first holding portion 21 and the second holding portion 31, and the linking member 20 is securely attached to the roof brace 8.

Figure 11B:
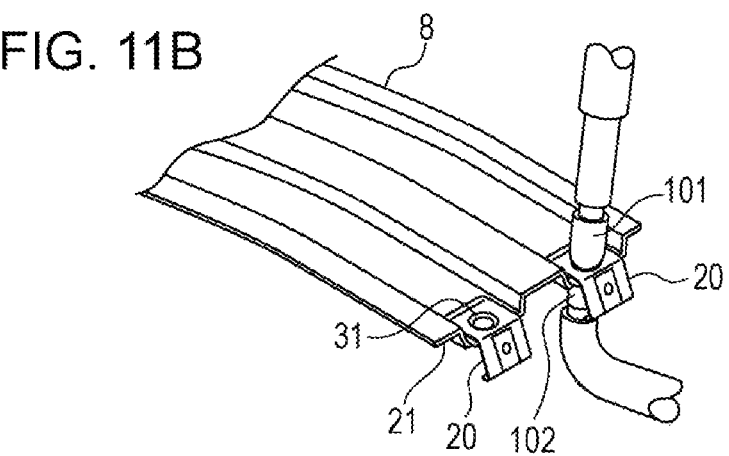
Figure 11C:
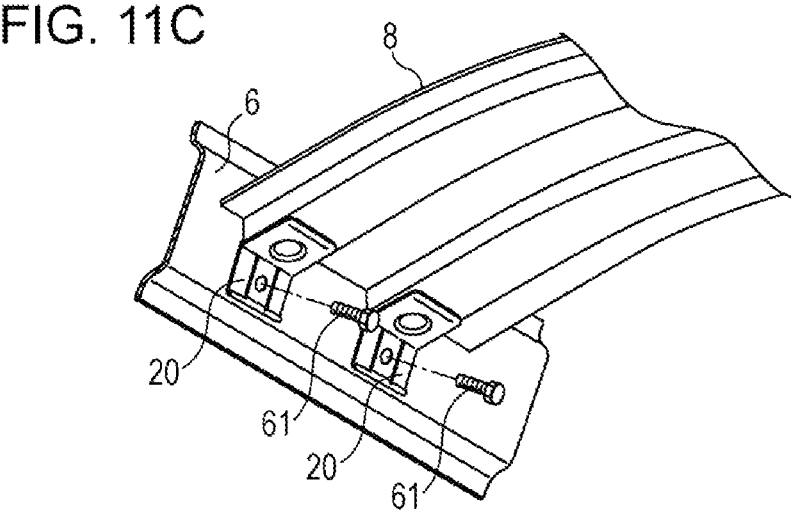

Next, in the linking member fixing procedure, the joining portion 30b of the first engaging protrusion 30 and joining portion 32b of the second engaging protrusion 32 which have been fit into the through hole 13 of the roof brace 8 and are into contact with each other, are held under a predetermined pressure by a pair of electrodes 101 and 102 of a spot welder, and welded by electroconduction, as illustrated in FIG. 11B.

The joining here is sure in this spot welding, since two steel sheets are directly welded by spot welding. The roof brace 8 is strongly joined by being held by the first holding portion 21 and second holding portion 31, due to the first engaging protrusion 30 and second engaging protrusion 32 having been inserted into the through hole 13 and joined.

In the subsequent attaching procedure, the roof brace 8 to which linking members 20 have been attached corresponding to the through holes 13, is attached to the side rail 6. Specifically, as illustrated in FIG. 11C, the attaching portions 24 of the linking members 20 which have been mounted to the side edge 8a of the roof brace 8 corresponding to the through holes 13 are overlaid on the side rail 6, bolts 61 are inserted through the bolt holes 24a of the attaching portion 24, and screwed into nuts provided to the side rail 6 beforehand, thus attaching the roof brace 8 to the side rail 6.

In a case where a shock load exceeding a predetermined value is input to the roof brace 8, according to this configuration, an end portion of the roof brace 8 at the through hole 13 and side edge 8a is crushed between the side extensions 27a and 27b and the and the first engaging protrusion 30 and second engaging protrusion 32 inserted through the through hole 13. The first supporting portion 22 and the fold portions 28a and 28b are deformed so as to curve away from each other, the first supporting portion 22 and second support portions 29a and 29b deform by bulging away from each other, and the base edge 21a of the first holding portion 21 and the base edge 31a of the second holding portion 31 move away from each other, thereby permitting deformation of the end portion of the roof brace 8.

Also, a through hole perimeter portion around the through hole 13, at the tip edge 21b and 31b side, which is pressed by the first engaging protrusion 30 and second engaging protrusion 32, is crushed. The side edges of the first holding portion 21 and second holding portion 31 are open up to the tip edges 21b and 31b, and thus readily separate and permit deformation of the through hole perimeter portion.

This avoids destruction and the like of the shock roof brace 8, since stress is not locally concentrated around the through hole 13 where the first engaging protrusion 30 and second engaging protrusion 32 are inserted, and the attachment range held between the first holding portion 21 and second holding portion 31, when shock load acts thereupon.

Note that the present invention is not restricted to the above-described implementation, and that various modifications may be made without departing from the essence of the invention. For example, while examples have been described above where a shock absorbing member 10 and a roof brace 8 formed of CFRP are linked using linking members 20 and the like formed of an iron-based metal, that is to say steel, the material of the shock absorbing member 10 and roof brace 8 is not restricted to CFRP, and may be changed to other materials as appropriate, such as metal materials like steel, aluminum alloy, or the like, synthetic resin material, or the like.

Also, while description has been made in the above implementation that the joining portion 30b of the first engaging protrusion 30 of the first holding portion 21 and joining portion 32b of the second engaging protrusion 32 of the second holding portion 31 are joined by spot welding, the he joining portion 30b of the first engaging protrusion 30 and joining portion 32b of the second engaging protrusion 32 may be fastened by bolting instead of spot welding. Also, an arrangement may be made wherein the configuration is simplified by omitting one or the other of the joining portion 30b of the first engaging protrusion 30 of the first holding portion 21 and the joining portion 32b of the second engaging protrusion 32 of the second holding portion 31, and forming, the one of the first holding portion 21 and second holding portion 31 from which the omission has been made, as a flat face.

Also, while description has been made in the above implementation that the attachment plate 17 and attaching portion 24 are spot-welded, the side extensions 27a and 27b may be joined to the attachment plate 17 by spot welding instead of the attaching portion 24. Further, both the attaching portion 24 and the side extensions 27a and 27b may be joined to the attachment plate 17 by spot welding.

Also, base side slits and tip side slits may be provided to the first holding portion 21 and second holding portion 31 of the linking members illustrated in FIGS. 7, 9, 10, and so forth, as well.

It should be noted that the present invention is not restricted to joining the above-described shock absorbing member and roof brace, and may be applied to joining other members as well.

The invention claimed is:

1. A member joining structure, comprising:
a body structural member of a vehicle;
a bumper of the vehicle disposed oppositely to the body structural member;
a shock absorbing member, disposed between the bumper and the body structural member, comprising a tubular member extending longitudinally in a direction extending from the bumper toward the body structural member, the tubular member including a first edge, a second edge opposite to the first edge in the direction extending from the bumper toward the body structural member, an inner circumferential face extending between the first edge and the second edge, and an outer circumferential face opposite to the inner circumferential face, a through hole being formed so as to continue from the inner circumferential face to the outer circumferential face; and
a linking member comprising:
a first holding portion and a second holding portion being plate-shaped facing one another, the first holding portion and the second holding portion holding the inner circumferential face and the outer circumferential face therebetween;
an engaging protrusion provided on at least one of the first holding portion and the second holding portion, the engaging protrusion being inserted into the through hole and configured to join the first holding portion to the second holding portion;
an attaching portion that supports the tubular member with respect to at least one of the body structural member and the bumper;
a first supporting portion that links a base edge of the first holding portion-to the attaching portion; and
a second supporting portion that links a base edge of the second holding portion to the attaching portion.

2. The member joining structure according to claim 1, wherein, in a center of the engaging protrusion, the through hole continuously extends from the inner circumferential face to the outer circumferential face.

3. The member joining structure according to claim 1, wherein the engaging protrusion protrudes into the through hole such that the through hole continuously extends from the first holding portion to the second holding portion.

4. The member joining structure according to claim 1, wherein the attaching portion links to the first supporting portion via a first fold portion that is bent with respect to the first supporting portion and links to the second supporting portion via a second fold portion that is bent with respect to the second supporting portion.

5. The member joining structure according to claim 1, wherein the first holding portion and the second holding portion are joined to each other at the engaging protrusion so as to being in contact with each other, and
wherein a perimeter edge of the first holding portion and a perimeter edge of the second holding portion are not linked with each other and include a gap therebetween.

* * * * *